United States Patent Office 3,257,358
Patented June 21, 1966

---

3,257,358
2,6-DICHLORO-1,4-POLYPHENYLENE ETHER
Gelu Stoeff Stamatoff, Newark, Del., assignor to E. I. du Pont de Nemours and Company, Wilmington, Del., a corporation of Delaware
No Drawing. Filed July 2, 1963, Ser. No. 292,468
10 Claims. (Cl. 260—47)

The present invention relates to novel polyphenylene ethers and their preparation, and more particularly, to high molecular weight polyphenylene ethers suitable as raw materials in the fabrication of films, fibers and other molded and extruded shapes. This application is a continuation-in-part of earlier applications, Serial No. 107,012, filed May 2, 1961 and Serial No. 269,715, filed April 1, 1963, both of which are continuation-in-part of application Serial No. 31,544, filed May 25, 1960, now abandoned.

Although it has been known heretofore that 2,6-disubstituted phenols and 2,6-disubstituted-4-halophenols may be subjected to oxidative coupling, no method is available for the preparation of high molecular weight, linear polyphenylene ethers through oxidation of 2,6-disubstituted-4-halophenols, and more particularly, through oxidation of 2,6-disubstituted-4-halophenolate ions.

It is, therefore, an object of the present invention to provide novel, high molecular weight polyphenylene ethers from 2,6-disubstituted-4-halophenols. It is another object to provide a method for the polymerization of 2,6-disubstituted-4-halophenols to disubstituted polyphenylene ethers. A further object is to provide a method for the polymerization of 2,6-dialkylsubstituted-4-halophenols to 2,6-dialkylsubstituted-1,4-polyphenylene ethers. It is a further object to provide a method for the copolymerization of 2,6-dialkylsubstituted-4-holaphenols with 2,4,6-trihalophenols to form fire-resistant polyphenylene ether copolymers. Still another object is to provide a method for the polymerization of 2,4,6-trihalophenols to form fire-resistant 2,6-dihalo-1,4-polyphenylene ethers. Other objects will become apparent hereinafter.

The objects of the present invention are achieved generally by a process which comprises admixing an initiator such as an inorganic peroxide, an organic acid peroxide, a persulfate, a hypochlorite, a hypobromite or an inorganic periodate with a phenolate ion having the generic formula

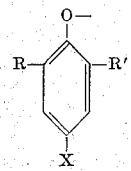

wherein R and R' are chlorine, bromine, iodine or alkyl groups having from one to three carbon atoms inclusive and X is chlorine, bromine or iodine, preferably bromine or iodine, in the presence of a liquid organic solvent capable of substantially dissolving the polymer, and recovering a solution of a polyphenylene ether in said organic solvent from which solution the polyphenylene ether may be separated by conventional methods such as by employing precipitative or distillative techniques. In some cases as will be described hereinbelow, it has been found that oxygen should be present in combination with the initiator. Moreover, for the preparation of high molecular weight polyphenylene ethers from certain phenolate ion monomers, as also will be described hereinbelow, it is desirable to have present during the polymerization an immiscible aqueous phase along with the liquid organic solvent. If X in the aforesaid generic formula is chlorine, it is more difficult to achieve the yields and molecular weights which are obtained, at least when employing the two phase aqueous-organic system, when X is either bromine or iodine. In this instance, however, that is, in the two phase system, by adjusting conditions so that the concentration of the chlorine-containing phenolate ion is higher, and the aqueous solution is more alkaline, than when the bromine- or iodine-containing phenolate ion is utilized, essentially quantitative yields of high molecular weight polyphenylene ethers may be obtained. The 2,6-disubstituted-4-halophenols used herein for the preparation of the disubstituted polyphenylene ethers may be symmetrically or unsymmetrically disubstituted. The terms "symmetrically disubstituted" and "unsymmetrically disubstituted" denote the similarity or non-similarity, respectively, of the groups attached to the 2- and 6-positions of the monomeric phenols.

While not wishing to be bound by any theory as to the mechanism of this polymerization, it is believed that this polymerization proceeds by an entirely new type of free-radical mechanism which is hereby termed a "free-radical condensation." The phenolate ion is converted to a colored free radical which then attacks the 4-position of another phenolate ion splitting out a halogen radical.

Agents suitable for initiating the polymerization of phenolate ions to high molecular weight polyphenylene ethers are initiators which are soluble in the polymerization medium and selected from the group consisting of inorganic peroxyacid salts, organic acid peroxides and organic or inorganic hypochlorites and hypobromites, for example, ammonium persulfate, benzoyl peroxide and tertiary-butyl hypochlorite. Hydrogen peroxide and organic hydroperoxides are not as effective. Other initiators may be used when the polymerization is carried out above room temperature. For example, at about 70° C. inorganic periodate salts are operable. When effecting the polymerization of phenolate ions which have an alkyl group attached to the 2- or 6-position, and especially when both positions are so substituted, it is desirable to introduce oxygen to the system. The oxygen, when necessary for the polymerization, generally is supplied to the reactoin system by carrying out the polymerization in an oxygen-containing environment in which excess quantities of oxygen are present. Air, also, may be utilized as the source of oxygen, however. The combination of initiator, a phenolate ion, and when required in the system, oxygen, produces the free radical at temperatures as low as 0° C., and at even lower temperatures in some cases. It, also, has been found that when employing the two phase aqueous-organic system, the addition of a water-soluble polyvalent metal salt such as copper sulfate, in catalytic quantities, aids in the formation of high molecular weight polyphenylene ether homopolymers. This addition has been found to be unnecessary in the copolymerization of 2,6-dialkylsubstituted-4-halophenols with 2,4,6-trihalophenols in as much as the trihalophenol comonomer acts as a cocatalyst. Of the trihalephenols useful as comonomers, 2,4,6-triiodophenol has been found to be the most effective in terms of cocatalytic activity. The initiator used in the process of the present invention is employed in quantities customary for the formation of high molecular weight polymers by means of free radical catalysts, that is, in concentrations generally varying from about 0.001 to 10 percent by weight of the monomer.

It is essential that the polymerization of the phenolate ions be carried out in the presence of an organic liquid phase capable of substantially dissolving the polyphenylene ether. If the polymerization is carried out in the absence of such an organic phase, for example, by employing solely an aqueous system, only low molecular weight polymers are obtained. Suitable solvents include liquid aromatic hydrocarbons, halogenated hydrocarbons and similar known solvents for polymers. Preferred solvents are aromatic hydrocarbons, such as benzene, xylene or toluene, halogenated aromatic hydrocarbons, trichloroethylene and tetrachloroethylene. When the polymerization is conducted in a two phase aqueous-organic system, the organic solvent is employed in dispersed form in the aqueous medium. Large droplets, such as are formed by mild mechanical agitation of an aqueous and immiscible organic phase, are sufficient. If desired, a surface active agent such as an alkali metal fatty alcohol sulfate, for example, sodium lauryl sulfate, may be employed to achieve a better dispersion of the organic phase in the aqueous phase. Other dispersing agents which often may be employed include the sodium salt of polymethacrylic acid, the sodium salts of styrene/maleic anhydride copolymers and polyvinyl alcohol. The quantity of the organic solvent generally should be sufficient to substantially dissolve and maintain the polymer in solution during the polymerization and, thus, depends in part on the solvent power of the compound employed. In general, the weight ratio of solvent to monomer should be at least one, and preferably much higher. When employing the two phase aqueous-organic system sufficient solvent is employed so that a 5 to 25 weight percent solution of polymer is obtained on polymerization.

As indicated hereinabove, the objects of the present invention include the preparation of 2,6-disubstituted-1,4-polyphenylene ethers. It has been discovered that in some cases the polyphenylene ether produced is not exclusively of the 1,4-variety but rather of both the 1,4- and 1,2-variety. This mixed polyphenylene ether may be obtained when a 2,4,6-trihalophenolate ion or a 2-alkyl-4,6-dihalophenolate ion is polymerized, either alone or in combination with other monomers, in the two phase aqueous-organic system. In this system, with this type of monomer, a halogen atom may be abstracted from a position either ortho or para to the oxygen atom of the phenolate ion. Such a polymerization mechanism obviously is unascertainable by means of conventional chemical analyses when polymerizing, for example, a 2,4,6-trihalophenolate ion wherein all three halogens are the same. Halogen analyses do confirm such a mechanism, however, when the phenolate ion being polymerized has a different halogen in the 4- than in the 2- and 6-positions. For example, when employing the two phase aqueous-organic system as taught herein for the polymerization of 2,6-dichloro-4-bromophenolate ion, the product polyphenylene ether contains substantial quantities of both chlorine and bromine, indicating that halogen has been removed from the ortho position of some phenolate ions and from the para position of others, to yield a mixed 1,2-, 1,4-polyphenylene ether. This structure has been confirmed by nuclear magnetic resonance measurements on the polymeric product. A similar structure has been confirmed for the polymer obtained, for example, from 2,4,6-trichloro-phenolate ion or 2,4,6-tribromophenolate ion, although elemental analyses fail to establish which of the halogens has been abstracted from the trihalophenolate ion monomer. Moreover, it has been discovered that polymers containing more than about twenty mole percent of the 1,2-structure yield products which are brittle, while those polymers containing a maximum of about twenty mole percent of 1,2-structure provide extremely tough products. This difference in toughness has been found to be indepedent of polymer molecular weight. As a further feature of the present invention it has been found that by effecting the polymerization in the complete absence of water, an exclusively 1,4-polyphenylene ether may be obtained from phenolate ions having a halogen atom ortho to the oxygen atom thereof. In other words, the ortho halogen atom is not abstracted during the course of the polymerization in this non-aqueous process. As a result of this discovery, it is possible to prepare not only exclusively 1,4-polyphenylene ether homopolymers but exclusively 1,4-polyphenylene ether copolymers employing phenolate ion monomers having a halogen atom ortho to the oxygen atom thereof.

In carrying out the aforesaid process in the absence of water a preformed, dry, sodium salt of a 2,4,6-trihalophenol, and especially a 2,6 - dichloro - 4 - halophenol, formed, for example, from the phenol and sodium hydroxide or sodium methoxide, preferably the latter, is suspended in an organic solvent capable of substantially dissolving the product polymer. Suitable solvents include liquid aromatic hydrocarbons, halogenated hydrocarbons and similar known solvents for polymers. Preferred solvents are aromatic hydrocarbons, such as benzene, xylene or toluene, halogenated aromatic hydrocarbons, trichlorethylene or tetrachloroethylene. To this suspension is added a complexing agent selected from the group consisting of dimethyl sulfoxide and N,N-dialkyl fatty acid amides. An initiator of the type and in the amount described hereinabove is utilized to initiate the polymerization. The polymerization initiator may be added stepwise or in its entirety by means of a single addition. The quantity of complexing agent added is not unduly critical, although generally the agent is employed in amounts equimolar with the phenolate ion monomer suspended in the organic liquid reaction medium. The time necessary to form the 1,4-polyphenylene ether may vary from several days to less than an hour depending upon the polymerization temperature, which generally is in the range $-20$ to $80°$ C., and preferably 25 to $60°$ C. The end of the polymerization is indicated by the disappearance of substantially all of the suspended phenolate ion and the absence of any further increase in viscosity of the organic liquid medium containing the dissolved polymer. The 1,4-polyphenylene ether can be separated from the organic solvent by a variety of methods, for example, by distillative removal of the solvent or by precipitative techniques employing precipitants such as acetone or methanol.

The polyphenylene ethers of the present invention, also, may be obtained using a two phase aqueous-organic system as the polymerization medium. This medium is useful for the formation of 2,6-dialkyl-substituted-1,4-polyphenylene ethers as well as for the formation of polyphenylene ethers having both 1,2- and 1,4-phenylene ether linkages along the polymer chain, such as would be obtained when an ortho-halo-substituted phenol is employed as a monomer. In carrying out the two liquid phase process the monomer, that is, the phenolate ion, is formed by adding one or more appropriate phenols to water and making the aqueous phase alkaline through, preferably, the addition of an alkali metal hydroxide. In general, the molar quantity of the alkali metal hydroxide is approximately equivalent to the molar quantity of phenol or, in the case of the copolymerizations, in slight excess, preferably from 5 to 8 mole percent excess. Substantially greater than equivalent quantities of the alkali metal hydroxide tend to lower the molecular weight of the product. The polymerizations generally are carried out at from room temperature of about $25°$ C. to about $60°$ C. although temperatures can be employed in the range of $-20$ to $80°$ C. The catalyst may be added stepwise or in its entirety by means of a single addition to the polymerization mixture. The polymer forms at the water and organic solvent interphase and dissolves in the organic phase. The time required to attain high molecular weight polymers under the conditions hereinabove specified may vary from several days at temperatures below $0°$ C. to less than an hour at $80°$ C. The end of the polymerization is indicated by the clearing of the aqueous phase from its light yellow opaque condition which resulted upon initiation of the polymerization, and the absence of any further increase in viscosity of the organic phase containing the dissolved polymer. The polymer can be isolated from the two phase polymerization medium in various ways. After separating the aqueous phase from the organic phase a convenient procedure is to add a large excess of a water-soluble organic liquid, such as acetone or methanol, to the organic phase. This causes the polymer to precipitate from solution, after which time it can be separated from the liquid phase by filtration or centrifugation. The homopolymerization of the phenolate ion is virtually quantitative and yields of purified polymer of close to 100 percent usually may be obtained. Yields of copolymers from 2,6-dialkylsubstituted-4-halophenols and 2,4,6-trihalophenols usually are at least 80 to 85 percent and approach quantitative yields when the molar ratio of alkyl substituted comonomer to halogen substituted comonomer in the polymer produced is greater than 85/15, that is, when the copolymer contains less than 15 mole percent of the halogenated comonomer.

Monomer mixtures of 25 to 99.9 mole percent of a 2,6 - dialkylsubstituted - 4 - halophenol and 0.1 to 75 mole percent of a 2,4,6-trihalophenol can be employed in the two phase copolymerization reactions. The preferred ranges in the comonomer mixture are 70 to 99.9 mole percent of a 2,6-dialkylsubstituted-4-halophenol and 0.1 to 30 mole percent of a 2,4,6-trihalophenol. Copolymers containing from 0.1 up to about 50 mole percent of dihalophenylene oxide units can be obtained from the above mixtures using the two liquid phase process of the present invention.

As described above, the monomers employed in the present invention comprise the anions of 2,6-disubstituted-4-halophenols. Examples of phenols which, in ionized form, can be employed in the process of the present invention are 2,6-dimethyl-4-bromophenol,
2,6-dichloro-4-bromophenol,
2,4,6-tribromophenol,
2,6-dimethyl-4-iodophenol,
2,6-diethyl-4-bromophenol,
2,6-diisopropyl-4-bromophenol,
2,6-diethyl-4-iodophenol,
2-methyl-4-bromo-6-isopropylphenol,
2-methyl-4-bromo-6-ethylphenol,
2-methyl-4-bromo-6-n-butylphenol and
2-methyl-4-bromo-6-chlorophenol.

The preferred monomers are ionized 2,6-dimethyl-4-bromophenol and 2,6 - dichloro-4-bromophenol. The phenolate ion monomers useful herein and obtained from the free phenol, also, may be represented by structural formulae which include

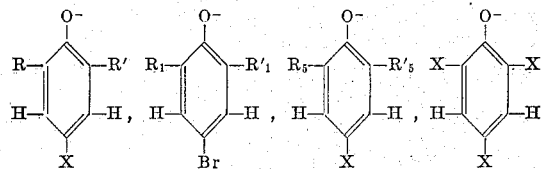

and

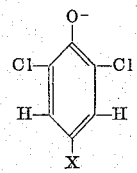

wherein R and R' are radicals selected from the group consisting of alkyl radicals having 1 to 3 carbon atoms inclusive, chlorine, bromine and iodine, $R_1$ and $R'_1$ are radicals selected from the group consisting of alkyl radicals having 1 to 3 carbon atoms inclusive, chlorine and bromine, $R_5$ and $R'_5$ are alkyl radicals having 1 to 3 carbon atoms inclusive and X is a halogen radical selected from the group consisting of chlorine, bromine and iodine. More than one phenol may be employed if copolymers are desired. For the preparation of fire-resistant, particularly non-burning, homopolymers, as hereinafter defined, the preferred monomers are the ionized 2,4,6-trihalophenols, and especially the 2,6 - dichloro - 4 - halophenols. It, also, has been discovered in the present invention that fire-resistant, particularly non-burning, copolymers, as hereinafter defined, may be prepared by copolymerizing with a 2,6-dialkylsubstituted-4-halophenol, a 2,4,6-trihalophenol, with only small quantities of the latter, for example, in some cases as little as three mole percent, being necessary to impart fire-resistant characteristics to the copolymer. For such fire-resistant copolymers the preferred monomers are the ionized 2,6-dialkylsubstituted-4-bromophenols and either ionized 2,4,6-tribromophenol or 2,4,6-trichlorophenol.

Employing 2,6-dimethyl-4-bromophenol, a high molecular weight homopolymer having superior physical properties is obtained by the two phase aqueous-organic process of the present invention. The polyphenylene ether homopolymers so prepared from 2,6-dimethyl-4-bromophenol generally have inherent viscosities above 1.0 as determined on a 0.5 percent solution of the polymer in benzene or chlorobenzene at 25° C. Polyphenylene ether copolymers prepared from 2,6-dialkylsubstituted-4-halophenols and 2,4,6-trihalophenols by means of the two phase aqueous-organic process of the present invention have inherent viscosities of at least 0.3, and in many cases over 1.0, as determined on a 0.5 percent solution in benzene or chlorobenzene at 25° C. The polyphenylene ethers prepared by means of the non-aqueous process have inherent viscosities of at least 0.3 as determined on a 0.5 percent solution in chlorobenzene at 50° C. Representative of the polymers prepared by the process of the present invention and which contain both 1,2- and 1,4-phenylene oxide linkages, as well as polymers containing exclusively the 1,4-phenylene oxide linkage, are polyphenylene ethers having more than five recurring units which may be selected from a group which includes

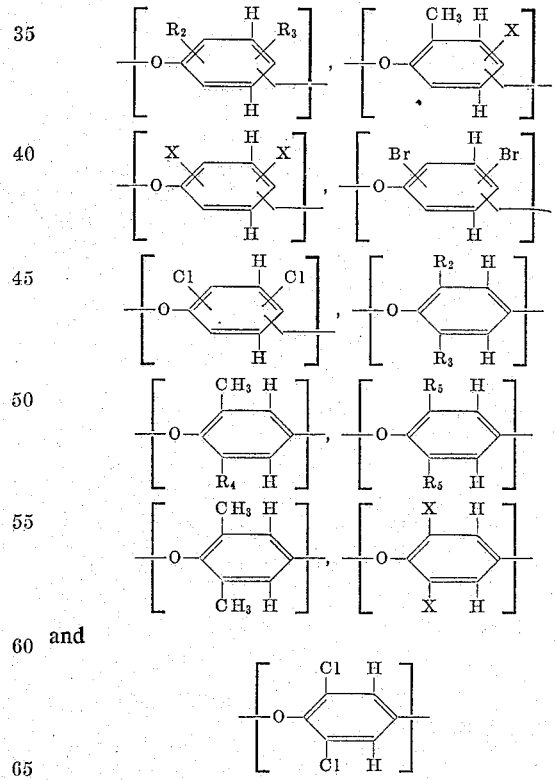

wherein $R_2$ is a radical selected from the group consisting of methyl, chlorine, bromine and iodine, $R_3$ is a radical selected from the group consisting of alkyl groups having 2 to 3 carbon atoms, chlorine, bromine and iodine, $R_4$ is an alkyl radical having 2 to 3 carbon atoms, $R_5$ and $R'_5$ are alkyl radicals having 1 to 3 carbon atoms inclusive and X is a halogen radical selected from the group consisting of chlorine, bromine and iodine.

The process is further illustrated by the following examples.

Example 1

Into a 180 ml. of polyethylene bottle were charged 100 ml. of water, 0.0354 mole of 2,6-dimethyl-4-bromophenol, 0.03825 mole of potassium hydroxide, 0.01 g. of cupric sulfate in 1 ml. of water, 0.05 g. of "Duponol" ME (sodium lauryl sulfate) in 1 ml. of water and 20 ml. of benzene. The air in the bottle was displaced with oxygen and the latter was then pressured to 15 p.s.i.g. The reaction mixture was agitated for 15 minutes. Three portions of 0.0002 mole of ammonium persulfate dissolved in 2 ml. of water were then added at 15 minute intervals. The reaction mixture was agitated for 14.5 hours at room temperature. The benzene layer of the reaction mixture was separated and washed and the poly(2,6-dimethylphenylene oxide) was precipitated from the benzene by the addition of acetone. On washing and drying 4.2 g. of poly(2,6-dimethyl-1,4-phenylene oxide) were obtained. The polyphenylene ether was found to have an inherent viscosity, as measured on a 0.5 percent solution of the polymer in chlorobenzene at 25° C., of 1.25. The outstanding physical properties of the high molecular weight homopolymer obtained from 2,6-dimethyl-4-bromophenol are shown below in Table I. The polymer was molded at 285° C. into 0.25 in. sheets which were used for the measurements.

TABLE I

| Temp., °C. | Flex. Mod. in p.s.i. | Tensile Strength in p.s.i. | Ultimate Strength in p.s.i. | Ultimate Elongation in percent | Tensile Impact Strength ft. lbs./in.$^3$ |
| --- | --- | --- | --- | --- | --- |
| 23 | 412,000 | 10,100 | 9,870 | 11 | 181 |
| 100 | 371,000 | 8,530 | 7,020 | 36 |  |
| 150 | 346,000 | 6,220 | 6,220 |  |  |
| 200 | 280,000 | 3,570 | 2,700 |  |  |
| 225 | 139,000 | 1,920 | 518 | 206 |  |

Example II

Employing the procedure of Example I with 0.1 g. of benzoyl peroxide in place of the ammonium persulfate as the initiator, the product obtained as above, also, had an inherent viscosity of 1.25.

Example III

Into a 180 ml. polyethylene bottle were charged 0.04 mole of 2,6-dimethyl-4-bromophenol and 110 ml. of water containing 0.04 mole of lithium hydroxide. The reaction mixture was agitated for 75 minutes until almost all of the phenol had dissolved. Undissolved phenol was removed. To the reaction mixture were added 0.01 g. of cupric sulfate in 1 ml. of water, 0.05 g. of "Duponol" ME in 1 ml. of water and 20 ml. of benzene. The air in the reaction bottle was replaced with oxygen and 0.0002 mole of ammonium persulfate in 2 ml. of water was added. Oxygen was recharged as needed. The reaction was continued for 4 hours with mild agitation. On workup of the reaction mixture, 4 g. of poly(2,6-dimethyl-1,4-phenylene oxide) having an inherent viscosity of 0.89 (measured as in Example I) were obtained. The polyphenylene ether was molded at 280–290° C. into tough, flexible films which on X-ray examination were determined to be amorphous.

Example IV

Into a 180 ml. polyethylene bottle were charged 0.04 mole of tribromophenol, 0.04 mole of lithium hydroxide in 100 ml. of water, 20 ml. of chlorobenzene and 0.2 g. of "Duponol" ME. The reaction mixture was agitated for 16 hours to form an aqueous solution of the phenol. The polymerization was initiated by the addition of 0.0002 mole of ammonium persulfate which was repeated after two hours. The mixture was agitated for a total of 47 hours. On standard workup 9.5 g. of polydibromophenylene oxide having an inherent viscosity of 0.64, as measured on a 0.5 percent solution of the polymer in tetrahydrofuran, were obtained. The polymer contained both 2,6-dibromo-1,4-phenylene oxide and 4,6-dibromo-1,2-phenylene oxide units as determined by nuclear magnetic resonance measurements.

Example V

Employing the procedure of Example IV with 2,6-dichloro-4-bromophenol instead of the tribromophenol, a polyphenylene oxide having an inherent viscosity of 0.4 was obtained. The polymer contained both 2,6-dichloro-1,4-phenylene oxide and 4-bromo-6-chloro-1,2-phenylene oxide units as determined by nuclear magnetic resonance measurements. Moreover, by chemical analyses the polymer was found to contain approximately equal weight percentages of bromine and chlorine, in the range 25–28 percent, indicating an approximately 2:1 ratio of 1,2-linkages to 1,4-linkages. Films compression molded from the polymer at about 280° C. were brittle.

Example VI

Into a 180 ml. polyethylene bottle were charged 0.04 mole of 2,4-dibromo-6-methylphenol and 100 ml. of water containing 0.04 mole of lithium hydroxide. The mixture was agitated for 3 hours and filtered. To the solution were then added 20 ml. of benzene, 0.25 g. of "Duponol" ME and 0.0002 mole of ammonium persulfate. The polymerization was allowed to continue for 64 hours at room temperature of about 25° C. The reaction mixture was worked up in the usual manner and 4.5 g. of a polyphenylene oxide were isolated. Nuclear magnetic resonance measurements confirmed the presence of both methyl-1,4-phenylene oxide units and methyl-1,2-phenylene oxide units in the product.

Example VII

Into a 180 ml. polyethylene bottle were charged 0.04 mole of 2,6-diisopropyl-4-bromophenol and 0.04 mole of lithium hydroxide dissolved in 100 ml. of water. The mixture was agitated in air for one hour to dissolve the phenol and 20 ml. of benzene were than added. After the addition of 0.05 g. of "Duponol" ME the polymerization was initiated by means of 0.0002 mole of ammonium persulfate. The reaction was continued for 16 hours with mild agitation. On separation and purification there was obtained 3.4 g. of poly(2,6-diisopropyl-1,4-phenylene oxide).

Example VIII

To a 180 ml. polyethylene bottle were added 100 ml. of water, 0.01 g. of copper sulfate dissolved in 1 ml. of water, 0.05 g. of sodium lauryl sulfate dissolved in 1 ml. of water, 0.044 mole of lithium hydroxide, 0.0415 mole of 2-methyl-4-bromo-6-isopropylphenol and 25 ml. of benzene. After the mixture was shaken for 15 minutes using a mechanical shaker to ensure dispersion, 0.0002 mole of ammonium persulfate dissolved in 1 ml. of water was added. Shaking was continued for two hours after which a like quantity of ammonium persulfate was added and shaking was continued for 48 hours. Air was supplied to the system throughout the entire time that oxygen was used up in the reaction. The polymer was precipitated with acetone, filtered, washed with water and dried to give 5.5 g. of product having an inherent viscosity of 0.6 and a stick temperature of 220–230° C. The polymer, poly(2-methyl-6-isopropyl-1,4-phenylene oxide), was compression molded at 200–250° C. into stiff, tough, transparent films which appeared to be completely amorphous according to X-ray analyses.

Example IX

Example VIII was repeated using in place of the 2-methyl-4-bromo-6-isopropylphenol a like molar quantity of 2-methyl-4-bromo-6-ethylphenol. The product, poly(2-methyl-6-ethyl-1,4-phenylene oxide), likewise, was compression molded at 200–250° C. into stiff, tough, transparent films.

Example X

Example VIII was repeated using 0.0415 mole of 2-methyl-4-bromo-6-n-butylphenol in place of the methylisopropyl derivative. The product, poly(2-methyl-6-n-butyl-1,4-phenylene oxide), had an inherent viscosity of 0.6.

Example XI

Example VIII was repeated using 0.0415 mole of 2-chloro-4-bromo-6-methylphenol in place of the methylisopropyl derivative. The product, poly(methyl-chlorophenylene oxide), had an inherent viscosity of 0.5. Nuclear magnetic resonance measurements confirmed the presence of both methylchloro-1,4-phenylene oxide units and methylbromo-1,2-phenylene oxide units in the product.

Example XII

A mixture of 20.6 g. (0.102 mole) of 2,6-dimethyl-4-bromophenol, 3.75 g. (0.011 mole) of 2,4,6-tribromophenol, 250 ml. of water, 0.123 mole of potassium hydroxide added as an approximately 0.5 N aqueous solution, 60 ml. of chlorobenzene, 25 ml. of a 1.5 weight percent aqueous solution of the sodium salt of a 1:1 styrene/maleic anhydride copolymer, and 0.1. g. of "Duponol" ME was added to a high shear mechanical mixer, such as an "Osterizer" or a "Waring" Blendor, and thoroughly mixed for 25 minutes. Thereafter, while continuing the agitation, a total of 0.0005 mole of ammonium persulfate was added over a four hour period of time. The reaction mixture was agitated for a total of five hours at 40–55° C. The polymer was precipitated as finely divided particles by the addition of excess acetone and isolated by suction filtration. The polymer was then washed for ten minutes with acetone in the mixer, isolated by filtration, washed with water and acetone, and dried at 100° C. in a vacuum oven. A yield of 12.3 g. of copolymer having an inherent viscosity of 0.98 (as measured on a 0.5 solution of the copolymer in chlorobenzene) was obtained. The copolymer contained 8 percent bromine by analysis, corresponding to the presence of 6.4 mole percent of halogenated monomer units in the copolymer. Once again, nuclear magnetic resonance measurements showed the presence of both 1,2- and 1,4-phenylene oxide units. On compression molding at 300° C., the polymer yielded a tough, transparent film. A polymerization of 2,6-dimethyl-4-bromophenol carried out under substantially the same conditions yielded a polymer having an inherent viscosity of 0.13 and a brittle compression molded film. The outstanding physical properties of the high molecular weight copolymer made in this example are shown below in Table II and the summary following. The polymer was molded at 300° C. into 0.25 in. sheets which were used for the measurements.

TABLE II

| Temp., ° C. | Flexural Modulus in p.s.i. | Tensile Strength in p.s.i. | Ultimate Elongation in percent |
|---|---|---|---|
| 23 | 467,000 | 10,600 | 49 |
| 100 | 416,000 | 8,220 | 48 |
| 150 | 387,000 | 5,980 | |
| 200 | 242,000 | 4,200 | |
| 225 | 202,000 | 2,500 | 61 |

Other properties determined were as follows:
Tensile impact strength—76 ft. lbs./inch$^3$.
Electrical properties (with 1 kc. frequency):
    (a) Dielectric constant=2.74
    (b) Power factor=0.0004
Heat distortion temperature—200° C./264 p.s.i.
Rockwell hardness—27 on M scale
Water absorption—0.2% at 25° C.; 0.4% at 100° C.
Resistance to:
    Hydrolysis—stable in alkali and nonoxidizing acids at room temperature or boiling.
    Thermal degradation—stable at 300° C.
Density—1.127 g./cc.
Creep—12% loss in "apparent modulus" after 100 hours under 2500 p.s.i. stress in flexure at 23° C.

Example XIII

A mixture of 21.5 g. (0.094 mole) of 2-methyl-4-bromo-6-isopropylphenol, 3.4 g. (0.010 mole) of 2,4,6-tribromophenol, 250 ml. of water, 0.111 mole of sodium hydroxide added as an approximately 0.5 N aqueous solution, 60 ml. of chlorobenzene, 0.5 g. of the sodium salt of a 1:1 styrene/maleic anhydride copolymer, and 0.1 g. of "Duponol" ME was added to a high shear mechanical mixer and thoroughly mixed. A total of 0.0006 mole of ammonium persulfate was added over a period of six hours. The reaction mixture was agitated at a temperature of 36° C. The polymer was precipitated by the addition of excess acetone and isolated by suction filtration. The remainder of the procedure was the same as that described in Example XII. Following workup 12.1 g. of copolymer containing both 1,2- and 1,4-phenylene oxide units and having an inherent viscosity of 0.52 were obtained.

Example XIV

Employing the procedure of Example XII the following reaction mixture was agitated for six hours at 37° C.: 16.04 g. (0.080 mole) of 2,6-dimethyl-4-bromophenol, 4.95 g. (0.020 mole) of 2,6-dichloro-4-bromophenol, 250 ml. of water, 0.111 mole of sodium hydroxide added as an approximately 0.5 N aqueous solution, 60 ml. of chlorobenzene, 0.5 g. of the sodium salt of a 1:1 styrene/maleic anhydride copolymer and 0.1 g. of "Duponol" ME. A total of 0.0006 mole of ammonium persulfate was added during the course of the reaction. After the resulting copolymer was isolated, washed, and dried, it weighed 8.8 g. and exhibited an inherent viscosity of 1.08. Nuclear magnetic resonance measurements confirmed the presence of both 1,2- and 1,4-phenylene oxide units.

Example XV

Employing the procedure of Example XII the following reaction mixture was agitated for five hours at 50–60° C.: 16.1 g. (0.08 mole) of 2,6-dimethyl-4-bromophenol, 2.0 g. (0.004 mole) of 2,4,6-triiodophenol, 250 ml. of water, 0.091 mole of sodium hydroxide added as an approximately 0.5 N aqueous solution, 50 ml. of chlorobenzene, and 0.1 g. of "Duponol" ME. A total of 0.0005 mole of ammonium persulfate was added during the course of the reaction. Following workup 10.1 g. of copolymer containing about five mole percent of the iodo monomer and having an inherent viscosity of 1.4 were obtained. The copolymer yielded a self-supporting film on compression molding. Nuclear magnetic resonance measurements confirmed the presence of both the 1,2- and 1,4-phenylene oxide structures.

Example XVI

Employing the procedure of Example XII the following reaction mixture was agitated for four hours at 36–56.5° C.: 22.2 g. (0.111 mole) of 2,6-dimethyl-4-bromophenol, 4.1 g. (0.012 mole) of 2,4,6-tribromophenol, 250 ml. of water, 0.13 mole of sodium hydroxide added as an approximately 0.5 N aqueous solution, 40 ml. of benzene, and 0.1 g. of "Duponol" ME. A total of 0.03 ml. of tertiary-butyl hypochlorite was added during the course of the reaction. Following workup 13.6 g. of copolymer having an inherent viscosity of 0.6 were obtained. The copolymer yielded a self-supporting film on compression molding. Both the 1,2- and 1,4-phenylene oxide structures were present in the copolymer as determined by nuclear magnetic resonance measurements.

Example XVII

Employing the procedure of Example XII the following reaction mixture was agitated for eighteen hours at about 25° C.: 1.78 g. (0.009 mole) of 2,6-dimethyl-4-bromophenol, 8.75 g. (0.027 mole) of 2,4,6-tribromophenol, 100 ml. of water, 0.037 mole of sodium hydroxide added as an approximately 0.5 aqueous solution, 50 ml. of chlorobenzene, and 0.05 g. of "Duponol" ME. A total of 0.0002 mole of ammonium persulfate was added during the course of the reaction. Following workup 2.9 g. of polymer having an inherent viscosity of 0.31 were obtained. Based upon a bromine content of 18.7 percent, the copolymer contained 16.5 mole percent of halogenated monomer units.

*Example XVIII*

To a solution of 40 g. of sodium hydroxide (1 mole) in 500 ml. of methyl alcohol were added 242 g. (1 mole) of 2,6-dichloro-4-bromophenol. After equilibration the solution was adjusted to a pH of about 9.0–10.0, preferably about 9.5, with either of the reactants. The pH was determined on a solution obtained by removing a 2.5 g. portion from the main reaction mixture and diluting with 100 ml. of 50 percent, by volume, aqueous methyl alcohol. After formation of the sodium salt of the phenol, the methyl alcohol and the water formed during the neutralization were distillatively removed under vacuum. A one liter round bottom flask was charged with 100 g. of the dry sodium salt of 2,6-dichloro-4-bromophenol, prepared above, 350 ml. of chlorobenzene and 40 ml. of dimethyl formamide. Stirring was effected until a solution was obtained, at which time 26 ml. of dimethyl sulfoxide were added. A suspension was again formed. After alternately evacuating and flushing with nitrogen to remove air, 1.0 g. of benzoyl peroxide dissolved in 10 ml. of toluene was added. The mixture was stirred for eighty minutes at 29–33° C., then for five hours at 54–59° C. Polymer formation was accompanied by the disappearance of a substantial portion of the solid particles from the stirred mixture and an increase in the viscosity of the liquid phase. Complete precipitation of polymer was effected by means of an excess of acetone. After separation of the polymer from the liquid phase by filtration, the polymer was washed under high speed agitation with water, then with acetone. Drying was achieved under vacuum at 100° C. A theoretical yield of 61 grams of poly(2,6-dichloro-1,4-phenylene oxide) was obtained.

*Elemental analyses.*—Theoretical: carbon, 44.7; hydrogen, 1.3; chlorine, 44.1; bromine, about 0. Found: carbon 44.6; hydrogen, 1.5; chlorine, 41.9; bromine, 1.1.

Repetition of the polymerization in air without any attempt to provide an inert atmosphere gave the same result, confirming as indicated hereinabove that oxygen has no effect on the polymerization of the non-alkylated, chlorine-containing monomers. The product was compression molded at 350° C. into a tough, almost colorless film. Analytical data are summarized in Table III.

TABLE III

Stick temperature _____ 300–310° C.
Inherent viscosity (0.5 weight percent solution in chlorobenzene at 50° C.) _____ 0.70.
Specific gravity at 25° C. _____ 1.466 g./cc.
Rockwell hardness _____ 27 on M scale.
Taber abrasion _____ 12.6 mg./1000 cycles.
Tensile impact _____ 48 ft. lbs./cu. in.

Electrical properties (with 1 kc. frequency):
 (a) Dielectric constant—2.91
 (b) Dissipation factor—0.0007
 (c) Volume resistivity—$8.59 \times 10^{16}$ ohm./cm.
 (d) Dielectric strength—1039 volts/mil at 0.020" thickness; 877 volts/mil at 0.0325" thickness Strength properties:

| Temperature, ° C. | Flexural Modulus (p.s.i.) | Tensile Strength (p.s.i.) | Ultimate Elongation, Percent |
|---|---|---|---|
| 23 | 402,000 | 12,600 | 9.4 |
| 100 | 384,000 | 8,640 | 8.4 |
| 150 | 352,000 | 5,920 | 7.8 |
| 200 | 299,000 | 2,690 | 14.0 |
| 225 | 260,000 | 198 | 136 |
| 250 | 241,000 | 50 | 268 |

Permeability (centibarrers):
 Nitrogen _____ 130
 Oxygen _____ 530
 Methane _____ 90
 Helium _____ 2,400
 Hydrogen _____ 3,400

*Example XIX*

Employing the procedure described in Example XVIII, 10 g. (0.0378 mole) of dry sodium salt of 2,6-dichloro-4-bromophenol were suspended in 35 ml. of chlorobenzene. After the addition of 3 ml. of dimethyl formamide and subsequent solubilization of the salt, 2 ml. of dimethyl sulfoxide were added, followed by 0.2 ml. of tertiary-butyl hypochlorite. Upon workup 6.0 g. of poly(2,6-dichloro-1,4-phenylene oxide) were recovered. Physical properties of the product were similar to those shown in Example XVIII.

*Example XX*

Example XIX was repeated employing as an initiator in place of the tertiary-butyl hypochlorite 0.0004 mole of lauroyl peroxide. There were recovered 5.8 g. of poly(2,6-dichloro-1,4-phenylene oxide).

*Example XXI*

Example XIX was repeated employing as an initiator in place of the tertiary-butyl hypochlorite, 0.1 g. of benzoyl peroxide dissolved in 1 ml. of toluene, and in place of the chlorobenzene, 36 ml. of toluene. Total reaction time was 6¾ hours. The poly(2,6-dichloro-1,4-phenylene oxide) product weighed 5.7 grams.

*Example XXII*

Example XXI was repeated without the dimethyl sulfoxide and employing only 16 ml. of toluene. The poly(dichlorophenylene oxide) weighed 4.6 grams.

*Example XXIII*

Example XXII was repeated employing in place of the toluene, 15 ml. of benzene, with the 0.1 g. of benzoyl peroxide being dissolved in 1 ml. of benzene. The poly(dichlorophenylene oxide) weighed 6.0 grams.

*Example XXIV*

Example XXII was repeated using in place of the dimethyl formamide, 5 ml. of dimethyl sulfoxide, and employing 26 ml. of toluene. The poly(2,6-dichloro-1,4-phenylene oxide) weighed 5.4 grams.

The polyphenylene oxide copolymers prepared according to the process of the present invention are not limited to trihalophenols as comonomers. Copolymers of 2,6-dialkylsubstituted-4-halophenols and pentahalophenols have been prepared in accordance with the process of the present invention and the resultant copolymers have yielded self-supporting compression molded films. Moreover, the polyphenylene ether copolymers made in accordance with the present invention from the 2,6-dialkyl substituted and the 2,6-dihalogen substituted monomers, employing the two phase aqueous-organic system, as well as the homopolymers from the 2,6-dihalogen substituted monomers, employing the non-aqueous system, have outstanding fire-resistant characteristics while maintaining physical properties at least equal to those exhibited by the non-chlorine-containing homopolymers. Table IV summarizes the burning characteristics of five of the polymers whose preparations are described in the examples. The flammability of these polymers was determined according to A.S.T.M. test D635–56T or, in some cases, according to a similar test employing non-standard specimens, said specimens being much thinner. It should be noted that the non-standard specimens would be expected to burn at a more rapid rate and therefore present a more stringent test of the polymer's resistance to burning.

TABLE IV

| Copolymer of 2,6-dialkyl-4-bromophenol and— | Preparation Described in— | Result of Flammability Test |
|---|---|---|
| No comonomer | Example I | Burning. |
| 2,4,6-tribromophenol | Example XII | Non-Burning. |
| 2,4,6-tribromophenol | Example XIII | Non-Burning. |
| 2,6-dichloro-4-bromophenol | Example XIV | Self-Extinguishing. |
| 2,4,6-triiodophenol | Example XV | Non-Burning. |

The effectiveness of the halogenated monomers in imparting fire-resistance to the copolymers varies with the nature of the halogen in the 2- and 6-positions of the comonomer ring. It was found that the order of effectiveness of the halogen in imparting fire-resistance to the copolymers was I>Br>Cl. It was discovered, that, in general, copolymers containing from about 3 mole percent of any of the halogenated comonomers were self-extinguishing. Copolymers containing greater than 3 mole percent of the dibromo- or the diiodophenylene oxide units, preferably from about 3 to 15 mole percent, are non-burning. At least 15 mole percent of dichlorophenylene oxide units, preferably from about 15 to 25 mole percent, are required to make such monomer-containing copolymers non-burning. As used herein, the term "fire-resistant" describes polymers which are both self-extinguishing and non-burning according to A.S.T.M. test D635–56T. The self-extinguishing polymers burn only as long as an external source of fire is provided while the non-burning polymers cannot be ignited even with an external source of fire.

The polymers prepared by the process of the present invention may be modified by the addition of stabilizers, antioxidants, fillers, pigments and similar additives known in the art.

The polyphenylene ethers are outstanding in utility, particularly at elevated temperatures, as a dielectric, a packaging material and a corrosion protector. They can be extruded into tough mono-filaments, fibers, ribbons, and the like. The above-described polyphenylene ether copolymers and, also, the 2,6-dihalogen substituted homopolymers offer the advantage of fire-resistance with no sacrifice in other physical properties. Since the polyphenylene ethers made by the process of the present invention have molecular weights high enough to give rise to tough, flexible shapes on melt fabrication, they find utility as a general plastic.

I claim:

1. A polyphenylene ether consisting essentially of units of the general formula

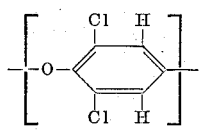

said polyphenylene ether having an inherent viscosity as measured on a 0.5 percent solution in chlorobenzene at 50° C. of at least 0.3.

2. Poly-(2,6-dichloro-1,4-phenylene oxide) having an inherent viscosity as measured on a 0.5 percent solution in chlorobenzene at 50° C. of at least 0.3.

3. A process for the preparation of polyphenylene ethers having an inherent viscosity as measured on a 0.5 percent solution in a solvent selected from the group consisting of benzene and chlorobenzene of at least 0.3, which comprises admixing initiator concentrations of an initiator selected from the group consisting of inorganic peroxyacid salts, organic acid peroxides, hypochlorites and hypobromites with an anhydrous phenolate ion having the generic formula

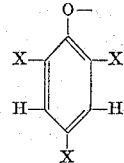

wherein X is a halogen radical selected from the group consisting of chlorine, bromine and iodine, in the presence of a complexing agent selected from the group consisting of dimethyl sulfoxide and N,N-dialkyl fatty acid amides and a liquid organic solvent capable of substantially dissolving the polyphenylene ether, and thereafter recovering a polyphenylene ether from the reaction medium.

4. A process for the preparation of polyphenylene ethers having an inherent viscosity as measured on a 0.5 percent solution in a solvent selected from the group consisting of benzene and chlorobenzene of at least 0.3, which comprises admixing initiator concentrations of an initiator selected from the group consisting of inorganic peroxyacid salts, organic acid peroxides, hypochlorites and hypobromites with an anhydrous phenolate ion having the general formula

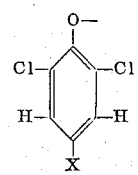

wherein X is a halogen radical selected from the group consisting of bromine and iodine, in the presence of a complexing agent selected from the group consisting of dimethyl sulfoxide and N,N-dialkyl fatty acid amides and a liquid organic solvent capable of substantially dissolving the polyphenylene ether, and thereafter recovering the polyphenylene ether from the reaction medium.

5. The process of claim 4 wherein the liquid organic solvent is an aromatic hydrocarbon.

6. The process of claim 4 wherein the liquid organic solvent is chlorobenzene.

7. The process of claim 4 wherein the initiator is benzoyl peroxide.

8. The process of claim 4 wherein the initiator is tertiary-butyl hypochlorite.

9. The process of claim 4 wherein the anhydrous phenolate ion is supplied by the sodium salt of 2,6-dichloro-4-bromophenol.

10. A process for the preparation of polyphenylene ethers having an inherent viscosity as measured on a 0.5 percent solution in a solvent selected from the group consisting of benzene and chlorobenzene of at least 0.3, which comprises admixing initiator concentrations of an initiator selected from the group consisting of inorganic peroxyacid salts, organic acid peroxides, hypochlorites and hypobromites with an anhydrous phenolate ion having the general formula

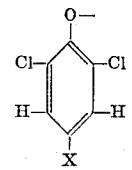

wherein X is a halogen radical selected from the group consisting of bromine and iodine, in the presence of at least one complexing agent selected from the group consisting of dimethyl sulfoxide and dimethyl formamide and a liquid organic solvent capable of substantially dissolving the polyphenylene ether, and thereafter recovering polyphenylene ether from the reaction medium.

References Cited by the Examiner

UNITED STATES PATENTS 3,134,753  5/1964  Kwiatek _____ 260—47

FOREIGN PATENTS 1,259,934  3/1961  France.

OTHER REFERENCES

Blanchard et al., J. Polymer Science, vol. 58, April 1962, pp. 469–490, pp. 476–485 relied on.

S. C. I. Monograph No. 13, pp. 231–247, pp. 235–240 relied on, August 1961.

Hunter, J.A.C.S., vol. 54, pages 2456–2463, June 1932.

Staffin et al., J.A.C.S., vol. 82, July 1960, pages 3632–3634.

Staffin, Rubber World, vol. 139, page 408, December 1958.

WILLIAM H. SHORT, *Primary Examiner.*

LEON J. BERCOVITZ, *Examiner.*

J. C. MARTIN, *Assistant Examiner.*